United States Patent

[11] 3,558,106

| | | | |
|---|---|---|---|
| [72] | Inventor | James T. Matsuoka<br>Brecksville, Ohio | |
| [21] | Appl. No. | 737,678 | |
| [22] | Filed | June 17, 1968 | |
| [45] | Patented | Jan. 26, 1971 | |
| [73] | Assignee | Intercole Automation, Inc.<br>Cleveland, Ohio<br>a corporation of Ohio | |

[54] PLASTIC MIXER
6 Claims, 8 Drawing Figs.

[52] U.S. Cl. .................................... 259/109,
18/2
[51] Int. Cl. .................................... B01f 7/02
[50] Field of Search ........................... 18/2EM,
EP, ES, 12A, DR, SA, SB, SE, SH, SN, SP, SR, ST,
SZ; 259/6, 9, 8, 7, 10, 106, 107, 108, 109, 110,
DK—H, (Rubber Mixers), 25, 26, 104

[56] References Cited
UNITED STATES PATENTS
1,356,691  10/1920  Bowen et al. ................ (18/2SPUX)

*Primary Examiner*—Edward L. Roberts
*Attorney*—Watts, Hoffman, Fisher & Heinke

ABSTRACT: An apparatus for mixing rubbers, elastomers, plastics and similar materials preferably of the internal mixer type, such as a Banbury type mixer, having a mixing chamber formed by side and end frame members detachably bolted together with at least one side frame member extending between the end frame members and keyed thereto by keys removable from the exterior of the apparatus so that the side frame member can be removed and replaced with no movement of the end frame members.

PATENTED JAN 26 1971 3,558,106

INVENTOR.
JAMES T. MATSUOKA
BY
Watts, Hoffmann, Fisher & Heinke
ATTORNEYS.

PATENTED JAN 26 1971

*INVENTOR.*
JAMES T. MATSUOKA
BY
Watts, Hoffmann, Fisher & Heinke
ATTORNEYS.

PLASTIC MIXER

BACKGROUND OF THE INVENTION

1. Field of the Invention

This invention relates to apparatus for mixing rubbers, plastics, elastomers, and similar materials having a mixing chamber housing mixing rotors and formed by side and end frame members, and more particularly to construction of and the manner of securing the side and end frame members together.

2. Description of the Prior Art

Apparatus of the character referred to has heretofore comprised mixing chambers housing mixing rotors and formed of side and end frame members detachably secured together. The construction was such that to remove one or more of the side frame members for maintenance repairs, etc. it was necessary to move at least one or both of the end frame members axially relative to the mixing rotors. This movement of one or both end frame members resulted in an increase in costly downtime of the apparatus.

SUMMARY OF THE INVENTION

The present invention provides an apparatus for mixing rubbers, elastomers, plastics, and similar materials having a mixing chamber formed by side and end frame members and housing mixing rotors extending through and/or supported in the end frame members, at least one of which side frame members extends between the end frame members and to which it is keyed and detachably connected in such a manner as to permit its removal and replacement with no movement or disturbance of end wall structure, mixing rotors, or bearings.

More particularly the present invention provides a mixing apparatus or machine of the character referred to having at least one sidewall member extending between the end wall structure or members and removably connected thereto by fasteners and key means removable from the exterior of the apparatus permitting removal of the sidewall member without disturbing the end wall structure, mixing rotors, or bearings.

The key means are provided to prevent relative movement between the side and end frame members when large forces are applied to them during mixing operations. This results in longer life of mixer components and reduced maintenance.

A general object of the present invention is the provision of novel and improved mixer apparatus construction of the character described in which the construction and arrangement of the key means facilitates removal of at least one sidewall member.

The invention resides in certain constructions and arrangements of parts and further objects and advantages will become apparent from the following description of the preferred embodiment and the accompanying drawings forming part of this specification, and in which.

DESCRIPTION OF THE PREFERRED EMBODIMENT

Figure 1:
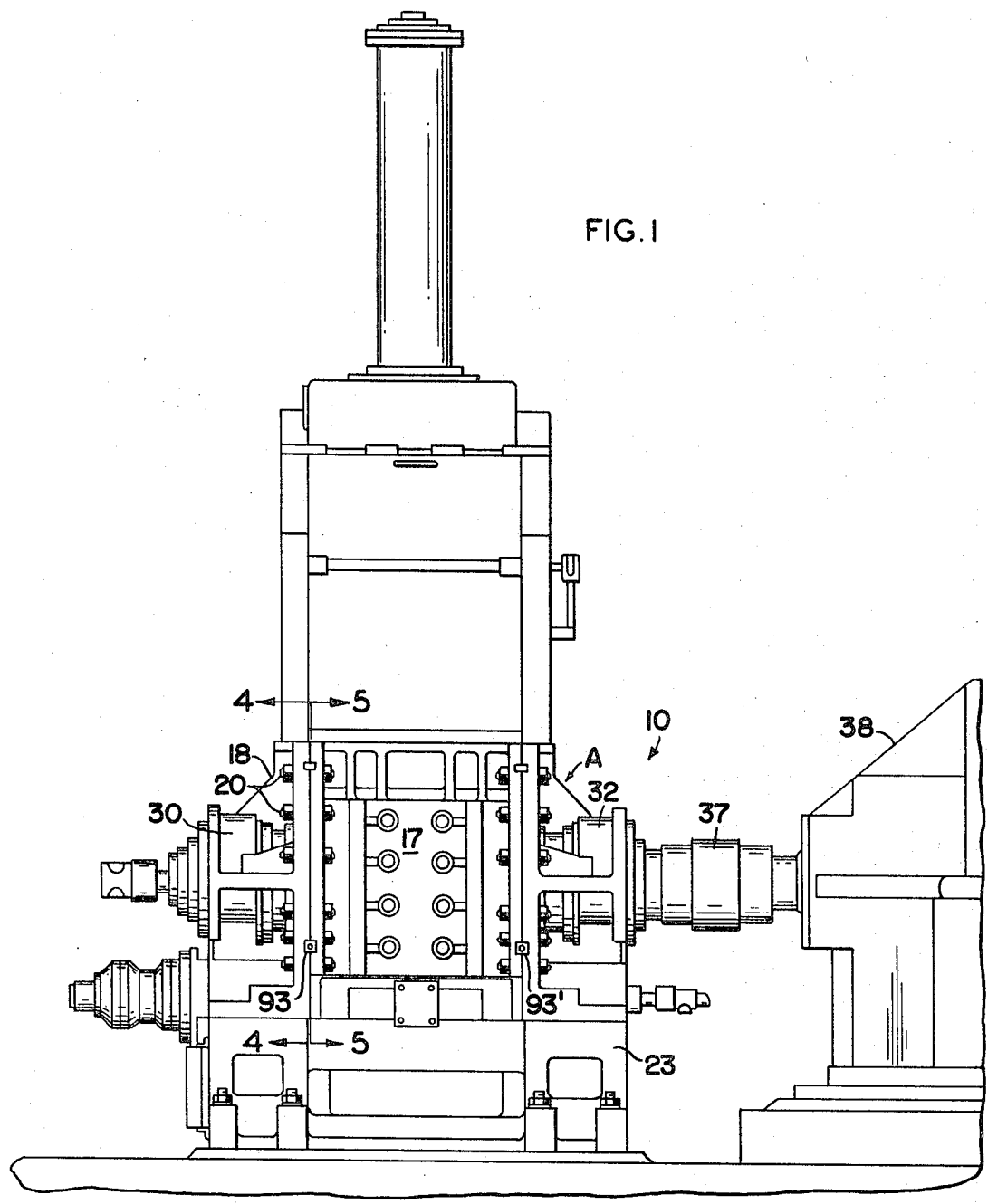
FIG. 1 is a fragmentary front elevational view of a mixing machine embodying the present invention.

A mixing machine 10 shown in the accompanying drawings is of the internal Banbury type and includes frame structure A forming a mixing chamber 12. The frame structure A includes a pair of spaced side frame members 16 and 17 opposite one another and extending between a pair of spaced end frame members 18 and 19. The side frame members 16 and 17 and the end frame members 18 and 19 are connected to one another by suitable fasteners such as double ended threaded, studs 20, and associated nuts fastening the side frame members 16 and 17 to the end frame members 18 and 19. The frame structure A is mounted on a base 23.

Figure 2:
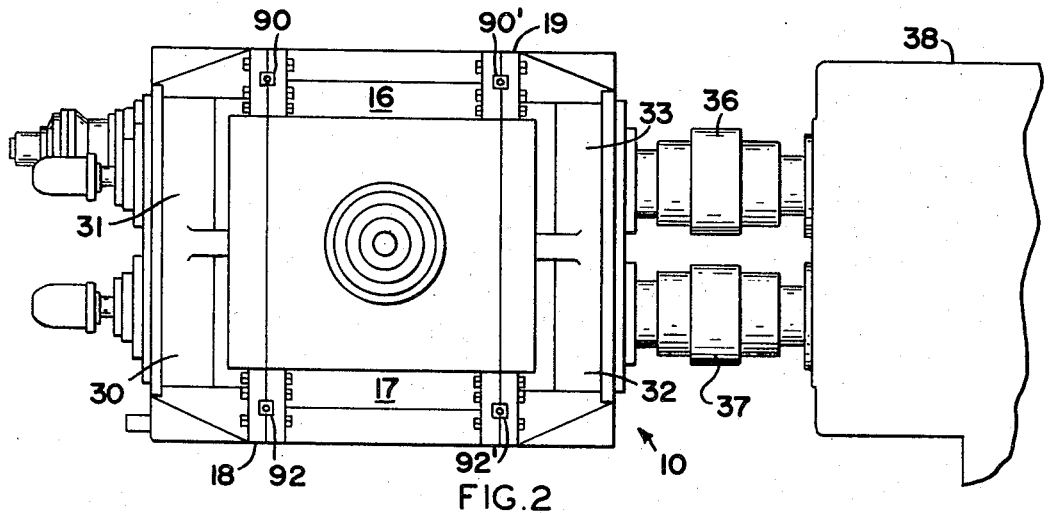
FIG. 2 is a plan view of the machine shown in FIG. 1.
Figure 3:
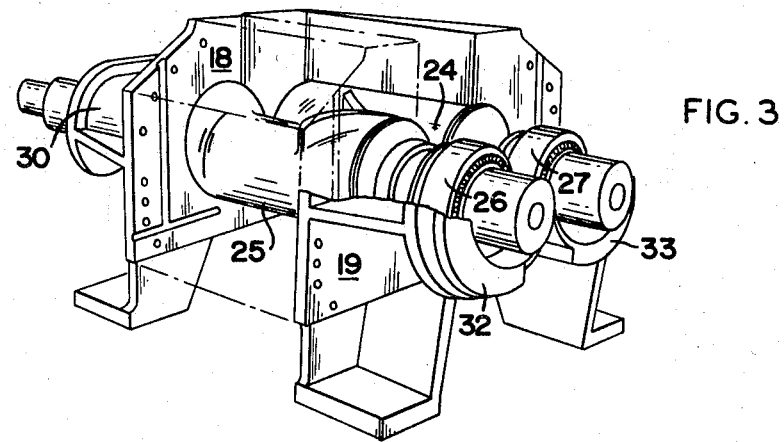
FIG. 3 is a fragmentary perspective view of the machine shown in FIGS. 1 and 2.
Figure 8:
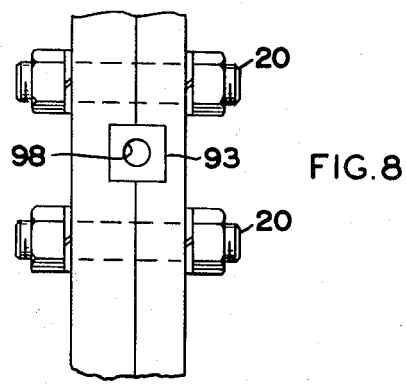

The frame structure A houses a pair of mixing rotors 24 and 25 which extend through and are supported by the end frame members 18 and 19. As best shown in FIGS. 2 and 3, the mixing rotors 24 and 25 are of the Banbury type and are mounted for rotation in bearings in journal boxes 30 and 31 formed in the end frame members 18 and in journal boxes 32 and 33 formed in the end frame member 19. One of two pairs of bearings 26 and 27 is shown in FIG. 3 rotatably supporting the mixing rotors 25 and 24, respectively. The rotors 24 and 25 may be driven through drive couplings 36 and 37 connected to a drive unit 38.

In the particular embodiment shown, the side frame members 16 and 17 are located on opposite sides of the mixing rotors 24 and 25. The side frame members 16 and 17 provide a top opening 40, a lower discharge opening 42 and in part define the mixing chamber 12.

Considering the side and end frame members in greater detail, only the structure of the end frame member 18 associated with the side frame members 16 and 17 will be discussed in detail. The structure of the end frame member 19 is similar to the structure of the end frame member 18.

Figure 4:
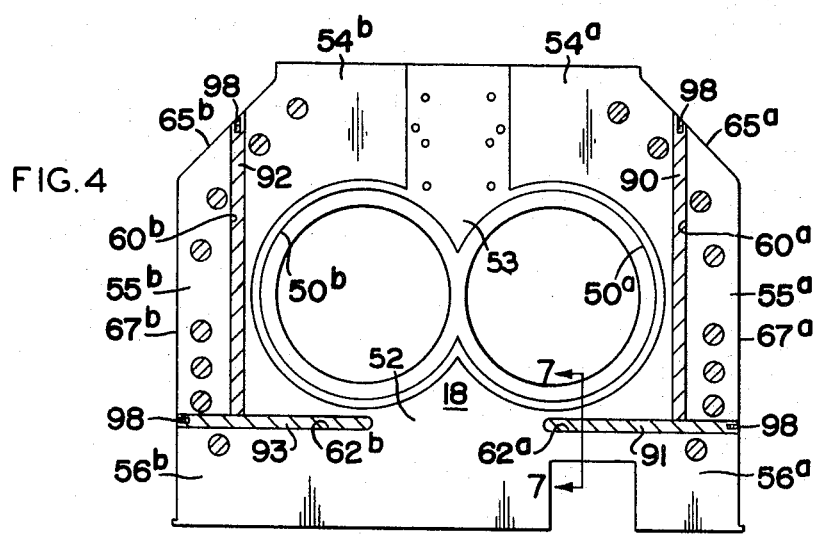
FIG. 4 is a view of an end frame member with added keys in section as seen along the plane indicated by the lines 4-4 in FIG. 1.
Figure 5:
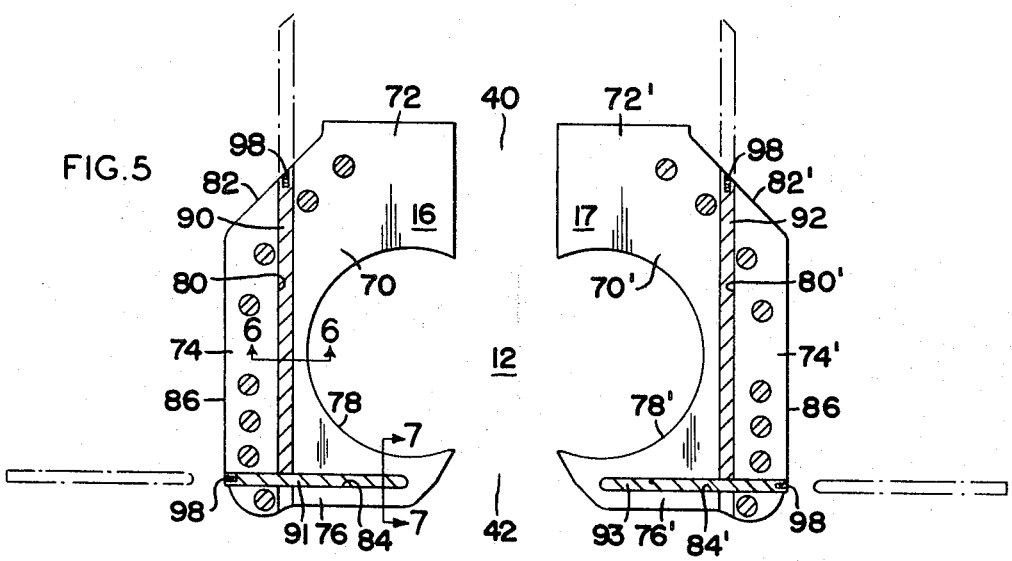
FIG. 5 is an elevational view of two side frame members as seen approximately along the plane indicated by the lines 5-5 in FIG. 1.

The end frame member 18 as shown in FIG. 4 is provided with a pair of generally cylindrical apertures 50a and 50b which communicate with one another and are adapted to receive the adjacent ends of the mixing rotors 24 and 25, respectively. The end frame member 18 is also provided with a substantially flat front wall surface 52 and a recessed portion 53 extending adjacent the apertures 50a and 50b and upwardly therefrom. The front surface 52 includes top portions 54a and 54b spaced from one another by that part of the recessed portion 53 adjacent an end of the top opening 40. The front surface 52 also includes a pair of midportions 55a and 55b 55a and 55b spaced laterally from the apertures 50a and 50b. A pair of bottom portions 56a and 56b lie beneath the apertures 50a and 50b, respectively.

The front surface 52 is further provided with a pair of spaced, parallel, vertical keyways 60a and 60b, respectively extending from the top portions 54a and 54b, through the midportions 55a and 55b, and into the bottom portions 56a and 56b. The front surface 52 is also provided with a pair of spaced, horizontal keyways 62a and 62b aligned with one another and extending across the bottom portions 56a and 56b, respectively. As shown, the keyways 60a and 60b are preferably normal to and terminate at their lower ends in the keyways 62a and 62b, respectively.

The upper ends of the keyways 60a and 60b communicate with the exterior of the frame of the mixer 10 at inclined side surfaces 65a and 65b situated laterally of the top portions 54a and 54b, respectively. The ends of the horizontal keyways 62a and 62b communicate with the exterior of the frame of the mixer 10 at vertical side surfaces 67a and 67b, respectively of the end frame member 18.

The structure of the side frame members 16 and 17 is similar, and only the structure of side frame member 16 will be discussed in detail. Corresponding a parts of the side frame member 17 will be identified by corresponding reference characters with a prime mark applied thereto.

The side frame member 16 is provided at one end with an end face 70 which is substantially flat for abutment with a corresponding portion of the front face 52. The end face 70 includes a top portion 72, a midportion 74 and a bottom portion 76, each of which is configured and abuts like portions of the front face 52. The side frame member is provided with a generally cylindrical front wall 78 which extends horizontally for receiving the mixing rotor 24.

The side frame member 16 is further provided with a vertical keyway 80 extending downwardly from the top portion 72, through the midportion 74, and through the bottom of the bottom portion 76. The upper end of the vertical keyway 80 communicates with the exterior of the frame of the mixer 10 at an inclined rear surface 82 of the side frame 16. The side frame member 16 is also provided with a horizontal keyway 84 in its bottom portion 76. The horizontal keyway 84 communicates with the exterior of the frame of the mixer 10 at a rear surface 86 of the side frame member 16. The vertical keyway 80 is normal to and extends through the horizontal keyway 84. Each corresponding pair of keyways 60a and 80; 60b and 80'; 62a and 84; and 62b and 84' oppose one another.

Figure 6:
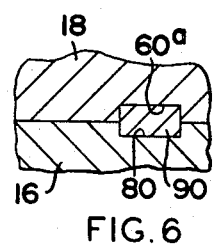
FIG. 6 is a fragmentary sectional view of a portion of side and end frame members and key structure as seen from the plane indicated by the lines 6-6 in FIG 5.
Figure 7:
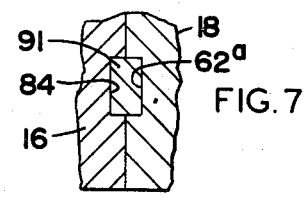
FIG. 7 is a fragmentary sectional view of a portion of the same side and end frame members and other key structure as seen from the plane indicated by the lines 7-7 in FIGS. 4 and 5; and, FIG. 8 is a fragmentary view of the side and end frame members with key structure and studs.

With the apparatus in an assembled condition, an elongated key 90 is disposed in one pair of opposed vertical keyways 60a and 80 and another elongated key 91 is disposed in the adjacent pair of opposed horizontal keyways 62a and 84. Similarly, an elongated key 92 is disposed in the other pair of opposed vertical keyways 60b and 80', and another elongated key 93 is disposed in the other pair of opposed horizontal keyways 62b and 84'. As shown in detail in FIGS. 6 and 7, the pair of keys 90 and 91 forming one set of keys are rectangular in cross section as are the two pairs of keyways 60a and 80, 62a and 84 forming one set of keyways. Both the keys and keyways are linear.

The keys 90—93 are aligned transverse to the longitudinal axes of the mixing rotors 24 and 25 and are provided for additional strength necessitated by loads caused by the rotors 24 and 25 during use. Each key is accessible from the exterior of the mixer 10 and is provided with a tapped hole 98 at its exposed end for receiving a tool to aid in its removal.

When it is desired to remove the side frame members 16 and 17 for maintenance or other purposes, the operator merely inserts a removal tool into the tapped holes 98 to remove the keys 90—93 and similar keys associated with the end frame member 19. After additionally removing the studs 20, either or both side frame members 16 and 17 may be removed laterally away from the remainder of the frame structure A with no disturbance to the end frame members 18 and 19, mixing rotors 24 and 25, or bearings 26 and 27.

It can be seen that removal of either or both of the side frame members 16 and 17 from the remainder of the frame structure 11 without disturbance of the other parts results in a savings of time, manpower, and expense, since less operations are necessary for removal. This will result in shorter downtime of the mixing machine 10 for maintenance, or other reasons and will permit it to be quickly disassembled and reassembled for further operation.

From the above detailed description, it will be apparent that the invention provides a novel and improved mixing machine in which side frame members may be removed from remaining frame structure without disturbing it. While the mixing machine shown has been described as having several pairs of opposed perpendicular keyways for receiving keys which are accessible from the exterior of the mixing machine, it is to be understood that other arrangements for accomplishing the same result are contemplated.

While a preferred embodiment of this invention has been described in detail, it will be understood that various modifications and alterations may be made therein without departing from the spirit and scope of the invention, as set forth in the appended claims.

I claim:

1. In a mixing apparatus, a frame including side and end frame members forming a mixing chamber, at least one mixing rotor projecting through the mixing chamber and extending into said end frame members, said side frame members having end surfaces in face-to-face relationship with portions of said end frame members, and means removably connecting opposite ends of at least one of said side frame members to said end frame members, said last-named means including at least one groove in each end surface of said one side frame member, a groove opposed thereto in each of said end frame members forming a keyway, and a key in each pair of opposed grooves, said grooves being open at one end to the exterior of said frame to facilitate insertion and removal of said key.

2. In a mixing apparatus, a frame including side and end frame members forming a mixing chamber, at least one mixing rotor projecting through the mixing chamber and extending into said end frame members, said side frame members having end surfaces in face-to-face relationship with portions of said end frame members, and means removably connecting opposite ends of at least one of said side frame members to said end frame members, said last-named means including two grooves in each end surface of said one side frame member arranged transverse to one another, grooves in each of said end frame members opposed to said grooves in the adjacent one of said end surfaces, and a key in each pair of opposed grooves, said grooves being open at one end to the exterior of said frame to facilitate insertion and removal of the key.

3. In a mixing apparatus, a frame including side and end frame members forming a mixing chamber, at least one mixing rotor projecting through the mixing chamber and extending into said end frame members, said side frame members having end surfaces in face-to-face relationship with portions of said end frame members, a keyway in each end surface of at least one of said side frame members and an opposed keyway in facing portions of said end frame members, and means detachably connecting said one side frame member to said end frame members, said last-named means including threaded fasteners and a key disposed in each pair of opposed keyways and removable from the exterior of said frame.

4. In a mixing apparatus, a frame including side and end frame members forming a mixing chamber, at least one mixing rotor projecting through the mixing chamber and extending into said end frame members, said side frame members having end surfaces in face-to-face relationship with portions of said end frame members, a pair of transverse keyways in said portions of said end frame members that face said end surfaces of at least one of said side frame members and a pair of transverse keyways formed in opposite ends of at least one of said side frame members in opposed relationship to said keyways of said end frame members, means detachably connecting said one side frame members to said end frame members, and keys disposed in said opposed keyways and removable from the exterior of said frame.

5. In a mixing apparatus, a frame including side and end frame members forming a mixing chamber, at least one mixing rotor projecting through the mixing chamber and extending into said end frame members, said side frame members having end surfaces in face-to-face relationship with portions of said end frame members, two pairs of transverse keyways in said portions of said end frame members, a pair of transverse keyways in each end of each side frame member in opposed relationship to the keyways in the end frame members, and means detachably connecting said side frame members to said end frame members, said last-named means including keys disposed in the keyways and removable from the exterior of said frame.

6. In a mixing apparatus, a frame including side and end frame members forming a mixing chamber, at least one mixing rotor projecting through the mixing chamber and extending into said end frame members, said side frame members having end surfaces in face-to-face relationship with portions of said end frame members, two pairs of transverse keyways in said portions of said end frame members, a pair of transverse keyways in each end of each side frame member in opposed relationship to the keyways in the end frame members, and means detachably connecting said side frame members to said end frame members, said keyways extending substantially the height and width of said side frame members and said last-named means including keys disposed in the keyways and being removable from the exterior of said frame.

UNITED STATES PATENT OFFICE
CERTIFICATE OF CORRECTION

Patent No. 3,558,106          Dated January 26, 1971

Inventor(s) James T. Matsuoka

It is certified that error appears in the above-identified patent and that said Letters Patent are hereby corrected as shown below:

In the abstract, line 3, cancel "such as a Banbury type mixer,"; column 2, line 4, cancel "Banbury"; line 17, cancel "Banbury" and insert -- internal --.

Signed and sealed this 19th day of December 1972.

(SEAL)
Attest:

EDWARD M. FLETCHER, JR.          ROBERT GOTTSCHALK
Attesting Officer          Commissioner of Pat